United States Patent Office 2,909,368
Patented Oct. 20, 1959

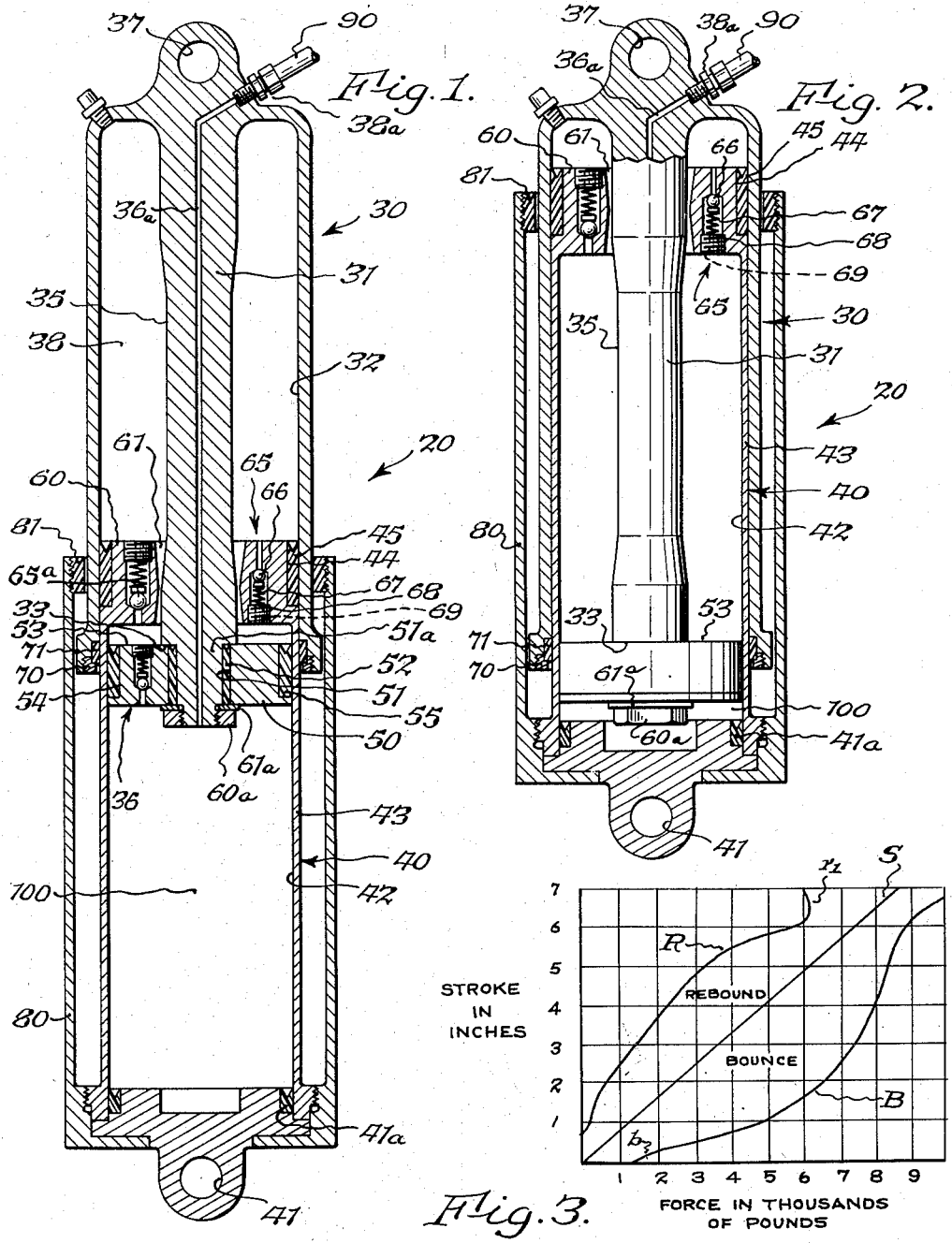

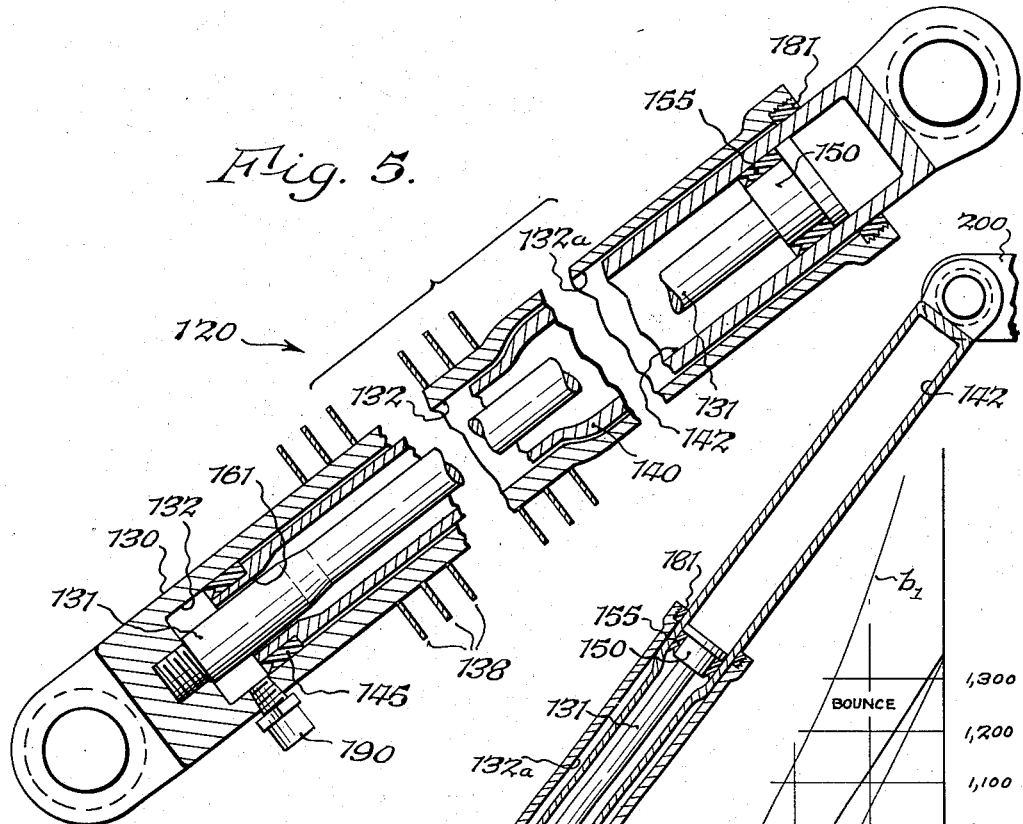

2,909,368

DIFFERENTIAL AREA LIQUID SPRINGS

Paul H. Taylor, Grand Island, N.Y.

Application January 13, 1955, Serial No. 481,658

25 Claims. (Cl. 267—64)

This invention relates generally to combined spring shock absorber suspension units of the oleo type used for aircraft landing gear and land vehicles and more particularly to an oleo strut comprising a low force differential area liquid spring having integral large displacement metered dampening.

Oleos of the hydrapneumatic types utilizing oil compressing a gas with metering pin orifice metering of the oil for shock dampening have been used on aircraft and automobiles. On aircraft these have been replaced in some instances by the more efficient liquid spring which includes a combined liquid spring using the piston shank as the spring, and integral shock absorption employing orifice metering of the entire volume of liquid in the liquid spring. This invention is intended to supersede both types of oleos by providing the basic advantages of both without their disadvantages. The hydrapneumatic oleo comprises a slender telescoping easily housed tubular member having low spring rates because of its air head with hydraulic dampening of excessive stroke or rebound. Its disadvantages include spring rate variations due to intermixing of oil and air, high preloads, fairly high weight and friction dampening. Service requirements are high because of air leakage. Liquid springs have replaced these in some aircraft because of their greater efficiency in weight and space at high spring rates for a given energy absorption. However, present liquid springs must use spring rates over 2000 pounds per inch deflection at which rate they attain a 300% advantage or efficiency compared with the existing mechanical springs or hydrapneumatic oleos and as the rates go to say 16,000 pounds per inch phenomenal efficiencies are realized of 10,000% or better.

Smaller aircraft and land vehicles generally only require a maximum of 1250 pounds per wheel statically and about 5 G's or 3750 pounds on a five inch travel providing a spring rate of only 750 pounds per inch. Liquid springs can only be used in such an installation by greatly levering or magnifying the travel of the spring. Since the lever is in bending, structural parts must be heavy. In particular levering is objectionable because it adds to the weight, space, structure and costs and further makes the assembly difficult to mount, retract and house. In addition, the mechanically levered gear cannot be used interchangeably with existing hydrapneumatic oleos or vehicle suspension systems because of different structural attachment and housing requirements. The magnification of the internal dampening of the spring makes it critical and difficult.

All present liquid springs are critical with respect to aircraft temperature requirements of —65° to +165° F. and vehicle temperature differentials which differentials contracts or expands the liquids in the spring and varies the length of the spring which is also magnified causing great stroke variations. With combined liquid springs dampening arrangements, on a levered arrangement, difficulty is encountered using the more efficient highly compressible liquids because as a liquid is compressed it increases in viscosity varying the orifice characteristics and the damping effect which levering magnifies. The more compressible liquids are extremely light and this effect is much greater in these highly compressible liquids and in some which are capable of polymorphism or the transition to solids in which a levered liquid spring located orifice is inoperative. Because of the present high pressures in liquid springs, piston areas and shafts are extremely small in diameter and anything over a short stroke of an inch at these rates makes the column length of the piston critical. Therefore existing liquid springs must be designed as a levered compromise between the short stroke high spring rate efficiency of liquid springs and the low spring rate long stroke requirements of aircraft and vehicles. Even with a levered short column, piston deflections in the unstable highly stressed piston shaft induces leakage in the accurate nonelastic seal of the high pressure chamber. In addition, seal friction increases with internal p.s.i. and in a levered compromise pressures must be higher so seal friction and friction dampening increase. Levering in a vehicle places the spring near the center line of the vehicle which increases the rolling moment of the car and the short stroke low volume dampening causes heat build-up and unpredictable spring performance. Existing levered liquid springs and suspension systems further have the disadvantage of failing to differentiate between falling in a hole, that is the wheel falling away from the chassis, or the chassis rebounding from a wheel. In the first instance dampening is not desirable, in the second instance it is.

Considering the application to light vehicles a 900 pound force per wheel on a 7½" stroke is 120 pounds per inch. Even with a canted or sea-leg installation with the unit inclined toward the frame a 6" stroke provides 150# per inch rate. This is obviously unsuited for present liquid spring design as a piston to support this load at the 20,000 p.s.i. could be only .050 in area or .250 in diameter. Obviously a ¼ inch diameter piston member 7" long will not support 900#S so the spring is impractical. Even on the heavy vehicle the 8800 pounds force requires only .4400 square inch area of piston having a .750 inch diameter. Now a .750 diameter rod 7" long is also a critical column member. One way of overcoming these difficulties is shown in my co-pending application 467,745 in which a short stroke high spring rate liquid spring is used and by hydraulic magnification a long stroke is achieved on a low pressure member which can therefore be of large diameter. However in this latter instance some volume is lost because of the low pressure stage increasing the unit bulk per given resilience.

There is another solution to the internal levering problem which has been tried by other liquid spring interests and this inventor in his experimentation for a low spring rate for machine tool applications. This involves the use of differential areas on the same piston shaft whereby as one area compresses another area subtracts so that the net area by which liquids are compressed can be for instance .05 or at 20,000 p.s.i. providing a 100# S per inch spring rate. While this is satisfactory for a low spring rate, high costs and low service life preclude its use except in special cases. High costs are created by the necessity for maintaining six tolerances within .0001 and with respect to each other. These tolerances are each area of the stepped piston shaft, each area of the cylinder and each seal. The requirement for a stiff, low elastic seal because of the ultra high pressures makes these critical tolerances mandatory. Even if these are held the friction build up because of a slight misalignment axially results in early leakage. I have found it mandatory in liquid spring design to allow a piston to seek its own center without restriction. Another difficulty in differential area design is that female seals are used because of the otherwise long co-axial bores of a male seal configuration which increases the poor conditions noted hereinbefore with respect to tolerance buildup. However, female seals do not work as well as male seals. In addition male seals on the differential area springs previously of record, increase their length by a third.

These inherent difficulties in present liquid spring or other suspension designs are critical on aircraft despite the relatively short use of an airplane gear and serious on land vehicles.

The principal object of this invention is to reduce the weight, space, structure and costs of a liquid spring for aircraft and particularly vehicles.

A second principal object is to provide a combined liquid spring shock absorber which can be completely interchangeable with existing aircraft hydrapneumatic oleos or replace present vehicle springs and shock absorbers within and at the present shock absorber location.

Another principal object is to provide micro piston areas in a liquid spring.

A combined principal object is to provide a liquid shock material which with suitable structure has a natural shock resistance plus low spring rate characteristics for part of the spring travel.

A related principal object is to provide a shock medium capable of differentiating between a free extension of a wheel and a rebound.

A primary object is to provide a direct action liquid spring providing large volume displacement for dampening with low volume liquid spring displacement.

Another object is to provide a stiff accurate guide for stiff high pressure seal members thus improving serviceability by reducing leakage.

Yet another main object is to provide high spring rate terminal travel in either direction of the spring medium.

A further object is to provide temperature compensation in a liquid spring.

Another object is to isolate the high pressure seal areas from dust or abrasive atmospheres.

Another important object is to provide a relatively low spring rate for a boulevard ride over the range of normal travel of the spring shock strut.

Another object is to provide a level ride.

Another object is the elimination of external levering.

A further object is a more rigid spring column.

Another object is isolation of the high pressure spring chamber from the elements.

A related object is to reduce the leakage effect from the seals of a liquid spring.

Another object is to provide low spring rate, undamped short stroke movement and combined natural and dashpot dampening of high velocity movement with high spring rate characteristics at terminal travel of the oleo unit.

Yet another object is to provide a long stroke spring member adapted to be applied directly to the wheel axle.

A related object is to reduce vehicle roll.

Another object is to provide a suspension unit which by changing liquids can be adapted to changing vehicle weights.

Yet another object is to provide a differential area spring in which the seals are not physically connected.

A related object is to provide a differential area spring in which each seal can seek its own center.

Another object is to provide a differential area spring using only male seals.

These and other objects and advantages will be apparent from the following description of the construction and operation of my novel spring.

Figure 1 is a sectional side elevation of a combined liquid spring-shock absorber, shown extended, for aircraft or heavy duty vehicles shown approximately half size for an 8800# 7 in stroke spring.

Figure 2 is a similar view but with the spring compressed.

Figure 3 is a graph of the characteristics of this spring.

Figure 4 is a sectional view extended of a combined spring shock absorber for automobiles shown half size and as it would be mounted on the front independent suspension of a vehicle.

Figure 5 is a full size broken view of the spring of Figure 4 shown compressed at the approximate position of the wheel and vehicle.

Figure 6 is a graph of the characteristics of this spring.

Figure 1 illustrates a combined liquid spring-shock absorber unit 20 for each leg of a tricycle gear on a 24,000 pound gross weight airplane or each wheel of a heavy duty truck having a sprung weight of 8800# S per wheel maximum. Unit 20 is shown approximately half size and as extended at 0 stroke with the pin eyes 37 and 41 respectively for the attachment to the frame and preferably the axle of a heavy duty track. For aircraft use the end 41 would be modified and include the axle of a dual wheel. Pin eye 37 is integral with the cylinder 32 of main cylinder assembly 30 and the sub-tracting piston rod 31 to which sub-tracting piston 50 (one of the differential pistons) is fastened. Assembly 30 is preferably a cold forged cylinder made by the backward extrusion method. Such a part has been made for me for liquid springs by the Mullins Manufacturing Company, Salem, Ohio, by their Koldflo process. Piston 50 has a shank bore 51 having an inner seal 52 which seals against the reduced attachment section 32 of shank 31 with face 53 of piston 50 abutting face 33 of shank 31 and held retained therein by nuts 60a and washer 61a. The resiliency of static seal 52 allows piston 50 to float for slight misalignment thus assuring that piston 50 will follow the wall of its cylinder. Piston 50 carries a male seal 55 in an annular groove 54 for sealing on the inner bore 42 of a main piston 40 for the sub-tracting of its area therefrom as a differential area for the reduction of spring rates in liquid springs. This is the main advantage of my invention providing a husky tubular piston member 40 by such an arrangement. Piston member 40 carries a seal 45 in groove 44 thereon for sealing against the cylinder 32. Piston member 40 may or may not but herein carries still another piston head 60 for sweeping the entire annular chamber 38 formed between metering shank 31 and cylinder 32 to provide large volume displacement for efficient shock dampening in a liquid spring. Thus as member 20 is telescoped slowly under load to the position of Figure 2, piston member 40 enters cylinder 30 while the liquid in chamber 38 passes through piston 60 without restriction and operates against the sub-tracting piston head 50 so that the net piston area is in effect the annular area of tube 43 or approximately for an 8800 pound spring at 20,000 p.s.i. internal of .28 square inches. This provides low spring rates in member 20 with the husky non-deflecting tubular members shown. Now dampening head 60 includes a fixed central orifice 61 surrounding shank 31 which has a metering surface 35 of any desired configuration for position metering at any part of the stroke. In aircraft use this might be the only metering means but in piston 60 I show compression metering valves 65 comprising ball 66 spring 67 and retainer plug 68 having a bore 69 therethrough. On fast compression balls 66 are forced off their seat 64 against springs 67 and meter liquid therethrough. In extension valves 65a are operated to control the rebound. The fixed orifice 61 with metering section 35 of shank 31 providing whatever constant flow characteristics are desired. It will thus be noted that I provide all the characteristics of a liquid spring having low spring rates because of the differential areas of piston 50 and 40 thus eliminating the levering requirements of previous liquid springs. What I have effected is internal levering which still permits the use of material compressibility in its customary high pressure efficiency range of 20,000 p.s.i.

while providing low spring rates for an aircraft or vehicle. In addition I have provided all the advantages of the present large displacement telescoping shock absorbers because I meter the entire liquid in chamber 38 through large area piston 60 and in addition provide position metering according to stroke by means of orifice 61 and metering surface 35.

In Figure 3 I illustrate the spring curve S disregarding dampening; I have shown the maximum velocity dampening curve B for bounce and R for rebound. The shape of these curves can be varied at will by controlling the shape of metering surface 35. Its present shape providing minimum orifices at terminal travel provides $b$, and $r_1$ respectively. This is intended to eliminate the necessity for the present rubber bumpers used on vehicles now by providing large dampening and high spring rates at terminal travel.

We will now consider the method of assembly, filling and varying the load of spring 20. Cylinder 30 is inverted and filled with a compressible medium preferably one of the silicones which have high compressibility. The tubular piston member 40 is inserted and the liquid leveled off to face 33 of metering shank 31. Piston head 50 is then installed. A high pressure grease gun is then used to fill and preload if desired through valve 36. Nylon guide bushing 71 is installed and held by retainer nut 70. Bushing 71 serves as a dust scraper and guide. Plug-pin eye end 41 is then installed which has seal 41a thereon. Dust cap retainer unit 80 is then installed retaining the assembly of cylinder 40 and plug-pin eye end 41 and nylon retainer wiper nut 81 is then installed to complete the assembly. Filler tube 90 can then be used to pressurize the assembly 20 or for filling at service periods. It could also be connected to a central high pressure pumping system for compensating for loads if desired. However since 20,000 p.s.i. systems are not now available I have provided a load compensating chamber 100 which can be pressurized with high pressure air from the aircraft or vehicle pneumatic system through bore 36a in shank member 31 and fitting 38a.

It will be obvious that since this substantially lower pressure system operates against the full area of piston head 50 that substantial load compensation will be realized from the low pressure of 100 p.s.i. operating against in this instance 7.66 square inches or 766 pounds force additive to the spring force.

Figure 4 details a modification designed particularly for light vehicles such as a passenger car of 3600 pounds gross weight. The unit 120 is shown attached to a high frame bracket 200 of a vehicle and to the lower arm of an independent suspension 201 preferably at or adjacent the king pin support. This provides a 6 inch travel at 150 pounds per inch deflection because of the sea-leg or canted construction for the 900# S, 7½ inch travel of the wheel. A liquid spring shock member 120, shown approximately half size is 21 inches long, 1¼ inch diameter. To achieve this low spring rate differential area of only .05 square inch equal to a rod ¼ inch in diameter. This is less than the area of any tubular piston 40 of the previously disclosed device applied to this application so means of reducing this area must be found and are disclosed herein.

Referring to Figures 4 and 5 member 120 comprises the outer tubular cylinder housing 130 having the stepped cylinder bores 132 and 132a respectively. A stepped tubular piston member 140 has a metering shank 131 and a seal 155 thereon. Member 131 is threadedly attached to cylinder 130 through orifice 161 of tubular stepped piston member 140 with piston member 150 riding in the enlarged bore 142 of piston 140. Seal 145 rides in the bore 132 of cylinder 130. It will be obvious with this construction that the net area of sealed piston 140 can be any size relative to piston 150 so that the net area of the differential area pistons can be as little as .05 square inch. In other words, the effective displacement of the tubular piston 140 per unit of linear travel of the piston in the spring is different from the volume of the portion of the piston corresponding to the linear travel. Metering is accomplished between orifice 161 and metering shank 131. Special valves could be built herein for metering if desired but I prefer in this construction to use a liquid capable of polymorphism, or change in form, such as some of the low viscosity dimethyl siloxanes for instance. In a polymorphic liquid, compression changes the liquid to a semi solid of the approximate viscosity of Vaseline if compressed slowly or if the heat of polymorphic transition is removed. This can be done by finning as at 138 wherein as heat is created radiation conducts it out of the polymorphic material. This provides a lower spring rate at a slow velocity as the material goes in and out of polymorphic transition. However, if suddenly activated, heat cannot be conducted and radiated fast enough and the liquid behaves like a straight compressible liquid. This provides a boulevard ride for slow undulations but a stiff ride for high speed undulation. Preferably the polymorphic range, that is that portion of the stroke where the boulevard ride is desirable is designed into the liquid. This is no problem as I have tested silicones having increments of 4000 p.s.i. for the beginning of the polymorphic ranges.

The use of polymorphic materials has another advantage in temperature compensation. By using a low polymorphic transition material alone or with a high polymorphic transition material and/or with a straight compressible medium, temperature compensation can be achieved. Using a low polymorphic transition material it maintains a constant initial pressure irrespective of temperature shrinkage or expansion of the other liquids thus the spring force is constant at any given low unloaded stroke.

Considering this construction further it will be noted that no dust shield is required because of the buried position of the seals 145 and 155 respectively. Nylon wiper ring 181 sufficing for this function. A further advantage in this light vehicle spring is the substantial telescoping of the tubular members 140, 130 providing spaced bearings at 181 and seal 145 which would minimize tendencies for side loading to cause leakage from seal 145.

With the separable piston member 150 it should be obvious that changing pistons would permit changing the metering characteristics and by changing bore 142 and piston 150 spring rates could be altered. This can also be accomplished by changing liquids. Servicing or ride compensation is possible by pressurizing through fitting 190.

Figure 6 shows a graph of such a spring using a straight compressible liquid having spring characteristics S, bounce dampening S and rebound R for maximum velocity. Obviously lower velocities will provide intermediate curves.

Although I have not illustrated it herein it is possible to seal only member 40, and seal on bores 32, shank 31 but the accuracy requirements of the parts would be such that the costs would be prohibitively high. In addition the female sealing on shank 31, would be critical. However for some low cycle applications using short life, more elastic seals, this might be desirable. My claims appended herein are intended to cover such a configuration.

Actually, I have determined that male seals such as used herein have a life expectancy of 3 to 1 over female seals because it is easier to expand a seal outward than inward. My novel construction which permits a differential area spring using male seals is thus important to the success of such a liquid spring.

The spaced nature of the seals when under high impact loading plus the rigidity of the telescoping tubular members is also of utmost importance.

The lack of connection between the seals allowing each to seek their respective centers without dependance on the other or inter-connection is also of importance.

Besides aircraft and vehicle use the basic differential area construction has many advantages in machine tool ordinance and many other applications.

Having thus described my invention it is intended that the appended claims cover any modification possessing the inherent advantages and features of my invention.

I claim:

1. A differential area spring having a micro piston area comprising a stepped pressure cylinder, a stepped tubular piston reciprocable therein having a sealed area equivalent to a reduced section of said tubular piston, a second piston having an enlarged head reciprocable within the enlarged section of said stepped tubular piston, a reduced tension member on said second piston attaching said second piston member to said stepped pressure cylinder through the reduced section of said stepped tubular piston, the net piston area of said differential pistons being less than the wall cross-sectional area of said tubular piston, and a compressible non-gaseous material in said cylinder and completely filling the space between said pistons.

2. A differential area spring having a micro piston area comprising a stepped pressure cylinder, a stepped tubular piston reciprocable therein having a sealed area equivalent to a reduced section of said tubular piston, a metering head formed therein, a second piston having an enlarged head reciprocable in an enlarged portion of said stepped tubular piston and a reduced metering and tension member attaching said second piston member to said stepped pressure cylinder through the metering head of said tubular piston, the net differential piston area of said pistons being less than the wall cross-sectional area of said tubular piston, and a compressible non-gaseous material in said cylinder and completely filling the space between said pistons.

3. A liquid spring comprising a chamber, piston means reciprocable in said chamber for pressurizing said chamber and a compressible liquid contained between said piston means and said chamber, said liquid containing a polymorphic liquid capable of undergoing reversible polymorphic transition in the range of temperatures and pressures encountered during normal operation of the spring and capable of applying initial pressure to said liquid whereby temperature effects are minimized.

4. A liquid spring comprising a chamber, piston means reciprocable in said chamber for pressurizing said chamber and a compressible liquid contained between said piston means and said chamber, said liquid containing a percentage of polymorphic material capable of undergoing reversible polymorphic transition in the range of temperatures and pressures encountered during normal operation of the spring and of sufficient volume to apply pressure from its transition substantially over the range of volume change of said compressible material due to temperature whereby said spring force remains substantially constant.

5. In a liquid spring, a cylinder, means for transferring heat from or to said cylinder, piston means reciprocable therein and a liquid polymorphic material in said cylinder capable of undergoing reversible polymorphic transition in the range of temperatures and pressures encountered during normal operation of the spring, said material upon compression to its critical pressure going through a transition to a semi solid and converting said energy to heat which is dissipated from said cylinder.

6. In a liquid spring, a cylinder, fin means on said cylinder for conducting heat therefrom, a tubular piston reciprocable therein, a second piston member fixed to said cylinder and positioned for reciprocable association with said tubular piston, a polymorphic compressible material contained between said cylinder and said pistons said polymorphic compressible material being capable of undergoing reversible polymorphic transition in the range of temperatures and pressures encountered during normal operation of the spring, said piston means reducing the area from which the heat of transition can be dissipated, as said spring is compressed.

7. A liquid spring comprising a cylinder having a closed end and an open end, a tubular piston having one end portion reciprocably disposed in said cylinder with a male seal secured to said end portion and in sealing engagement with the wall of said cylinder, a piston member secured to said cylinder and reciprocably disposed in said tubular piston, said piston member having a male seal secured thereto in sealing engagement with the inner wall of the tubular piston, and a compressible liquid completely filling the volume defined within said cylinder and said tubular piston between said seals, said first named male seal excluding said compressible liquid from between said tubular piston and the wall of said cylinder, and said second named male seal preventing by-pass of said compressible liquid past said piston member.

8. A liquid spring according to claim 7 including an annular wiper guide secured at the open end of said cylinder and in sliding engagement with the outer wall of said tubular piston to prevent entry of foreign matter into said cylinder and to form a guide for said tubular piston.

9. A liquid spring according to claim 7 wherein means are provided sealing the end of said tubular piston opposite to said one end portion to form a variable volume sealed chamber filled with air.

10. A compressible non-gaseous material spring comprising a cylinder, a tubular piston having two internally stepped portions of different internal cross-sectional areas at least one of which is reciprocably disposed in said cylinder, a piston head disposed for reciprocation in one stepped portion of said tubular piston, means securing said piston head to said cylinder, sliding seal means between said piston head and the internal surface of said one stepped portion of said tubular piston, and sliding seal means between said cylinder and the outer surface of said tubular piston to provide an effective piston area between the two sliding seal means different from the cross-sectional area of the tubular piston.

11. A spring comprising a cylinder, a pair of operatively associated pistons, one of said piston members being fixed to said cylinder and the other piston member being tubular whereby its exterior acts as a piston member and its inside bore is the cylinder for said first fixed piston member, a first male seal on said tubular piston member and disposed in sliding sealing engagement with the inner wall of said cylinder, and a second male seal on said one piston member and disposed in sliding sealing engagement with the inner wall of said tubular piston member, a compressible non-gaseous material in said cylinder and completely filling the space between said seals, said first male seal excluding said compressible non-gaseous material from between said tubular piston member and the inner wall of said cylinder, and said second male seal preventing by-pass of said compressible non-gaseous material past said one piston member, whereby said pistons are adapted for providing differential compression of said non-gaseous material in said cylinder between said seals.

12. A spring comprising a cylinder, a pair of operatively associated pistons each having a male seal thereon, a compressible non-gaseous material in said cylinder and completely filling the space between said seals, each of said male seals being formed to prevent by-pass of said non-gaseous material past the respective pistons to confine the non-gaseous material to the space between the seals, one of said pistons being fixed to said cylinder and the other piston being reciprocably disposed with respect to said cylinder and said first piston member for the differential compression of said non-gaseous material between said seals.

13. A spring comprising a cylinder, a first piston member having a male seal thereon and disposed in said cylinder, a reduced tension section securing said first piston member to said cylinder, a second piston member having a male seal thereon and reciprocable in the annular space between said first piston and said cylinder, a compressible non-gaseous material in said cylinder and completely filling the space between the male seal on said first and second piston members, each of said male seals being formed to prevent bypass of said non-gaseous material past the respective piston members to confine the non-gaseous material to the space between the seals, and a piston head on said second piston member disposed in linear metering association with said reduced tension section and having a plurality of one-way metering valves carried therein for bounce and rebound dampening of said second piston ring and providing a predetermined metered flow from its linear association with said reduced tension section.

14. A spring adapted for separately compressing a liquid and air comprising a pair of relatively reciprocable tubular members, one adapted to be the cylinder and the other the piston of a liquid spring, a second piston member carried by said cylinder member and sealing the inside of said tubular piston member, said second piston and said tubular member defining within said cylinder a first variable sealed volume, a compressible liquid completely filling said first variable sealed volume, said second piston defining within said tubular piston member a second variable sealed volume filled with air, and means providing compressed air at a predetermined pressure in said second variable sealed volume.

15. In a spring adapted for separately compressing a liquid and air, a plurality of reciprocable telescoping cylinders, a piston fixed in one of said cylinders and reciprocable in the other thereby providing a pair of separate variable volume sealed chambers, a compressible liquid completely filling one of said chambers, and means providing compressed air at a predetermined pressure in the other of said chambers.

16. In a liquid spring, a cylinder, means for rapidly dissipating heat from said cylinder or absorbing heat into said cylinder, piston means reciprocable in said cylinder, and a normally liquid polymorphic material in said cylinder capable of undergoing reversible polymorphic transition in the range of temperatures and pressures encountered during normal operation of the spring, said material upon compression to its critical pressure going through a transition to a different form having a lower volume at substantially the same pressure.

17. A spring comprising collapsible mechanism including a casing having two pistons reciprocable in opposite directions throughout the stroke of the spring in response to external loads applied to the pistons, a compressible non-gaseous material contained by said mechanism in said casing between said pistons, and sliding seal members in said casing carried by said pistons for preventing by-pass of said non-gaseous material past said pistons and for changing the volume of the non-gaseous material in response to the relative movement between the pistons to differentially compress the non-gaseous material.

18. A spring comprising collapsible mechanism including a casing having two pistons reciprocable in opposite directions throughout the stroke of the spring in response to external loads applied to the pistons, one of said pistons being of tubular configuration and containing the other piston, a compressible non-gaseous material contained by said mechanism in said casing between said pistons, and sliding seal members in said casing carried by said pistons for preventing by-pass of said non-gaseous material past said pistons and for changing the volume of the non-gaseous material in response to relative movement between the pistons to differentially compress the non-gaseous material.

19. A liquid spring according to claim 7 including a metering shank having a variable cross sectional area and secured at its one end to the closed end of said cylinder and at its other end to said piston member, and means at the end of said one end portion of said tubular piston defining a reduced diameter annular orifice about said metering shank.

20. A spring comprising a cylinder, a tubular piston reciprocably disposed in said cylinder, a first sliding seal member secured to said cylinder and reciprocably disposed in said tubular piston, a second sliding seal member disposed between said cylinder and said tubular piston and carried by the tubular piston, a compressible non-gaseous material completely filling the space in said cylinder and said tubular piston between said seal members, said first seal member preventing by-pass of said compressible non-gaseous material past the first seal member, and said second seal member excluding said compressible non-gaseous material from between said tubular piston and the wall of said cylinder, and means for providing relative movement between said seal members in response to external loads applied to said spring for changing the volume in said chamber between said seal members to differentially compress said non-gaseous material.

21. A spring comprising collapsible mechanism including a reciprocable tubular piston having two inner and outer portions of different cross-sectional areas, piston means operatively associated with said collapsible mechanism and said portions of said tubular piston and movable in the opposite direction in response to external loads applied to the tubular piston and the piston means to provide an effective piston displacement per unit of lineal movement of the tubular piston which is different from the corresponding displacement volume of the piston for the same lineal movement, and a compressible non-gaseous material disposed in said collapsible mechanism and confined between said tubular piston and said piston means.

22. A compressible non-gaseous material spring comprising a cylinder, a tubular piston having two portions at least one of which is reciprocably disposed in said cylinder, piston means carrying sliding seal means operatively associated with the inner surface of one of said portions, said tubular piston and said piston means being movable in opposite directions in response to external loads applied to the tubular piston and the piston means, sliding seal means carried by the tubular piston and operatively associated with the inner surface of said cylinder to provide an effective piston displacement per unit of lineal movement of the tubular piston between the two sliding seal means which is different from the corresponding displacement volume of the piston for the same lineal movement, and a compressible non-gaseous material disposed in said collapsible mechanism and confined between said tubular piston and said piston means.

23. A spring comprising a cylinder, a tubular piston having two portions at least one of which is reciprocably disposed in said cylinder, piston means carrying sliding seal means operatively associated with the inner surface of one of said portions, sliding seal means carried by said tubular piston and operatively associated with the inner surface of said cylinder to provide an effective piston displacement per unit of lineal movement of the tubular piston between the two sliding seal means which is different from the corresponding displacement volume of the piston for the same lineal movement, a compressible non-gaseous material completely filling the space in said cylinder and said tubular piston between said sliding seal means, and means for applying external loads to said tubular piston and said piston means to provide relative movement between said seal means in response to said external loads.

24. A compressible non-gaseous material spring comprising a cylinder, a tubular piston having two portions at least one of which is reciprocably disposed in said cylinder, a piston head disposed for reciprocation in one portion of said tubular piston, said tubular piston and said piston head being movable in opposite directions in response to external loads applied to the tubular piston and the piston head, a male seal secured to said piston head and slidably disposed against the inner wall of said one portion of said tubular piston, a male seal secured to the other portion of said tubular piston and slidably engaging the wall of said cylinder to provide an effective piston displacement per unit of lineal movement of the tubular piston between the two male seals which is different from the corresponding displacement volume of the piston for the same lineal movement and a compressible non-gaseous material completely filling the space in said cylinder and said tubular piston between said male seals.

25. A compressible non-gaseous material spring comprising collapsible mechanism including a tubular piston, piston means operatively associated with said tubular piston and movable in the opposite direction in response to external loads applied to the tubular piston and the piston means to provide an effective piston displacement per unit of lineal movement of the tubular piston which is different from the corresponding displacement volume of the piston for the same lineal movement, and a compressible non-gaseous material disposed in said collapsible mechanism and confined between said tubular piston and said piston means.

References Cited in the file of this patent

UNITED STATES PATENTS

| | | |
|---|---|---|
| 1,759,674 | Wallace | May 20, 1930 |
| 2,094,882 | Garnett et al. | Oct. 5, 1937 |
| 2,146,089 | Onions | Feb. 7, 1939 |
| 2,333,096 | Dowty | Nov. 6, 1943 |
| 2,346,667 | Dowty | Apr. 18, 1944 |
| 2,363,485 | Down | Nov. 28, 1944 |
| 2,472,415 | Geisse | June 7, 1949 |
| 2,523,714 | Nilsson | Sept. 26, 1950 |
| 2,559,967 | Katz | July 10, 1951 |
| 2,805,854 | Gaebler | Sept. 10, 1957 |

FOREIGN PATENTS

| | | |
|---|---|---|
| 11,726 | Great Britain | of 1894 |
| 430,471 | Italy | May 30, 1944 |
| 664,972 | Great Britain | Jan. 16, 1952 |